United States Patent Office 3,260,684
Patented July 12, 1966

3,260,684
CATALYTIC PROCESS FOR POLYMERIZING TETRAHYDROFURAN
Margot Becke and Arno Debo, both of Heidelberg, Germany, assignors to Olin Mathieson Chemical Corporation, a corporation of Virginia
No Drawing. Filed Aug. 9, 1961, Ser. No. 130,260
Claims priority, application Germany, Aug. 26, 1960, B 59,136
1 Claim. (Cl. 260—2)

The present invention relates to a process for the polymerization of compounds containing a tetrahydrofuran ring.

Tetrahydrofurans have previously been polymerized using as catalysts, tertiary oxonium salts of halogen acids, halides of metals or of non-metals the etherates of which are capable of forming tertiary oxonium salts, electrophilic halides of metals or of non-metals in the presence of halogen acids, acyl halides, anhydrides of inorganic or organic acids, inorganic acids with difficultly polarizable anions. Polymerization products, consisting essentially of polytetramethylene oxide, are also obtained by the reaction of tetrahydrofuran, boron trifluoride and diazomethane or diazoacetic ester. These known catalysts all apparently form primary oxonium salts of the type:

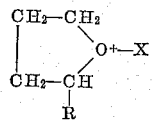

in which R is hydrogen, alkyl or acyl, and X is the anion of a difficultly polarizable acid or $BF_3$. These oxonium salts appear to form a carbonium ion of the type:

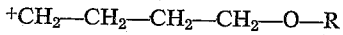

which readily adds on to other tetrahydrofuran molecules to form oxonium salts again and thus are capable of initiating polymerization.

A principal disadvantage of these known processes is that the crude polymer is contaminated by the catalysts and must undergo tedious purification.

It has now been discovered, surprisingly enough, that the polymerization of tetrahydrofurans can be achieved with insoluble, readily separable catalysts which, therefore, act by an entirely different reaction mechanism by carrying out the polymerization in the presence of certain polyphosphonitrile halides and a salt. Oily polyphosphonitrile dihalides with more than $4PNCl_2$ (or $4PNBr_2$) units per molecules are used with a suitable salt as catalysts according to the present invention.

Mixtures of polyphosphonitrile diahalides as they are precipitated in the known production processes and without purification are suitable.

The term "oily phosphonitrile halides" as used in the present specification and claims includes substances or mixtures of substances which are formed in addition to crystalline material in the usual processes for the production of phosphonitrile halides. These products contain large amounts of polymers having the formula $(PNX_2)_n$ in which X is halogen and $n$ is more than 4. It is also possible to use polyphosphonitrile dihalides which have been further treated, for instance, the crude oily phosphonitrile dichloride prepared according to the processes mentioned above and from which the trimeric and tetrameric constituents have been removed. Also useful are the oily polyphosphonitrile dihalides of a definite degree of polymerization such as the oily phosphonitrile dichlorides prepared according to M. Becke-Goehring and G. Koch, Chem., Ber. 92 1188 (1959). In addition, the corresponding oily phosphonitrilic bromides are useful in the process of this invention. In the absence of a suitable salt, the oily phosphonitrile halides are ineffective to polymerize the tetrahydrofurans. Crude reaction products of $PCl_5$ and $NH_4Cl$ containing oily polymers of $(PNCl_2)_n$ and some unreacted $NH_4Cl$ are effective. Effective catalysts can also be obtained by the further action of $PCl_5$ on crystalline $(PNCl_2)_3$ to form oily higher polymers. Suitably 0.3 to 2 moles of $(PNCl_2)_3$ are reacted with 1 mole of $PCl_5$. The reaction product of 0.66 mole of $(PNCl_2)_3$ with 1 of $PCl_5$ is particularly preferred. These crude reaction products when mixed with salts are useful catalysts.

The salt that is also necessary for carrying out the reaction is also ineffective alone but must be used in conjunction with an oily phosphonitrilic halide. The salt can be an inorganic salt or a salt having an organic cation or anion. In general, the salts that are most suitable are those that are highly dissociated. Generally, anhydrous salts should be used. Ammonium chloride, sodium chloride or calcium chloride are cheap, readily available and effective. Examples of other suitable inorganic salts include potassium chloride, potassium bromide, ammonium bromide, sodium sulfate, potassium sulfate, ammonium sulfate, sodium carbonate and potassium carbonate. Other suitable salts are those containing an organic anion and an inorganic cation, for example, sodium acetate, ammonium acetate and the like. Salts containing an organic cation and an inorganic anion are also suitable and include tetramethylenediamine dihydrochloride and tetraethylammonium chloride.

The quantities of phosphonitrile dihalides and salts necessary for the polymerization are very small. The addition of about 0.5 to 5 percent by weight based on the tetrahydrofuran compound is appropriate. With less than about 0.5 percent the reaction is unduly slow and little increase in rate is produced by more than about 3 percent. The same proportions of the salts are used. When calcium chloride or tetramethylenediamine dihydrochloride is used, the necessary heating time is approximately 2 hours. By using 0.5 part of ammonium chloride, the same results are obtained as with the use of 1 part of sodium chloride.

The conversion is carried out especially easily, as the whole mix is conveniently heated under reflux. Thus suitable temperatures are generally between about 50° C. and the atmospheric boiling point of the tetrahydrofuran used. For example, tetrahydrofuran is boiled under reflux for some hours with about one percent by weight of oily phosphonitrile chloride and about one percent by weight of a salt. The syrupy solution is separated while hot by, for instance, decantation from the solid catalyst residue which contains the salt. After cooling, the unpolymerized tetrahydrofuran is distilled from this solution. The polymerized tetrahydrofuran remains behind as a white mass, insoluble in water, that feels slightly greasy. The polymer obtained in this manner has an indefinite melting point between 40 and 45° C.

The process of the invention is also suitably carried out in an excess of the tetrahydrofuran as solvent or in an inert solvent. The stable ethers boiling above about 50° C. are suitable inert solvents. The dialkyl ethers are suitable inert solvents as well as the alkyl aryl ethers, for example, di-n-butyl ether, anisole and p-chloroanisole. From 10 to 90 percent of the reaction mixture may be inert solvent.

Besides tetrahydrofuran itself, the process of this invention is also appropriate to substituted tetrahydrofurans containing substituents which are inert under the polymerization conditions. Alkyltetrahydrofurans, particularly lower alkyltetrahydrofurans in which the alkyl group or groups contain a total of 1 to about 8 carbon atoms, are usefully polymerized according to the process of this invention. Examples include 2-methyltetrahydrofuran, 2-ethyltetrahydrofuran 3-isopropyltetrahydrofuran, and 2,3-di-isobutyltetrahydrofuran.

The polymerization products obtained in accordance with the invention are useful per se as thermoplastics or mixed with other high molecular weight compounds.

In the following examples all the quantities are expressed in parts by weight.

*Example I*

An oligomeric phosphonitrile chloride was perpared by heating 1000 parts of $PCl_5$ and 200 parts of ammonium chloride in an autoclave to 150–175° C. until no more hydrogen chloride was evolved. The reaction product was extracted several times with petroleum ether to remove the trimers and tetramers of phosphonitrile chloride. After filtration of the oil that remained behind, it was distilled under high vacuum. A yellow distillate product was obtained having the formula $(PNCl_2)_n$ in which $n$ was between 6 and 6.5. One part of this polymeric phosphonitrile chloride, 1 part of sodium chloride and 100 parts of tetrahydrofuran were heated under reflux for 3 hours. The hot solution was then filtered through glass wool to remove the catalysts and the unpolymerized tetrahydrofuran was distilled off under water aspirator vacuum. The 37 parts of polymeric tetramethyleneoxide which remained had a melting point of about 41° C.

*Example II*

Three parts of the undistilled crude phosphonitrile dichloride oil produced according to Example I were heated to boiling under a reflux condenser with 1 part of ammonium chloride and 100 parts of tetrahydrofuran. After a reaction time of 2 hours the solution was decanted from the catalyst residue and the excess tetrahydrofuran was distilled off under the vacuum produced by the water aspirator. 51 parts of solid polymeric tetramethylene oxide remained behind.

*Example III*

A mixture of 1000 parts of $PCl_5$ and 200 parts of $NH_4Cl$ were heated in an autoclave at about 170° C. until termination of hydrogen chloride evolution, and the crude product was filtered through a glass frit. Five grams of the filtrate, 1 part of ammonium chloride and 100 parts of tetrahydrofuran were heated for six hours under a reflux condenser. The warm syrup was decanted from the catalyst residue and the unpolymerized tetrahydrofuran was distilled off under the vacuum produced by the water aspirator. 27 parts of solid polymeric tetramethylene oxide remained behind.

*Example IV*

A mixture of 21 parts of $PCl_5$ and 23 parts of $(PNCl_2)_3$ were heated at 200 to 220° C. in an autoclave for 48 hours with occasional stirring. The oily polymer, which partially crystallized on cooling was used without further treatment.

A mixture of one part of this oily polymer, one part of calcium chloride and 100 parts of tetrahydrofuran was refluxed for two hours. The warm reaction mixture was filtered through glass wool and the unreacted tetrahydrofuran was removed in a vacuum. Thus 85 parts of solid polymeric tetrahydrofuran was obtained.

*Example V*

A mixture of 1 part of the oily polymer of $PNCl_2$, prepared as described in Example IV, in 100 parts of tetrahydrofuran was heated at 50° C. for one hour. The reaction mixture was filtered to remove catalyst and the unpolymerized tetrahydrofuran was removed in a vacuum leaving 78 parts of polymeric tetrahydrofuran.

*Example VI*

A mixture of 23 parts of $PCl_5$ and 11 parts of $(PNCl_2)_3$ was heated at 220° C. for 48 hours in an autoclave. One part of the crude product was refluxed with 200 parts of tetrahydrofuran for 4 hours. After removing the catalyst by filtration and removing the unpolymerized tetrahydrofuran by vacuum distillation, 110 parts of polymeric tetrahydrofuran was obtained.

*Example VII*

A $(PNCl_2)_n$ polymer was prepared as described by M. Becke-Goehring and Koch, Chemische Berichte 92, 1193 (1959), by heating a mixture of 1000 parts of $PCl_5$ and 200 parts of ammonium chloride at 150–200° C. until no more HCl was evolved. The reaction product was filtered through glass wool to remove the crystalline polymers which are inactive as catalysts. One part of the filtered oil and 200 parts of tetrahydrofuran was heated under reflux for four hours. After removing the catalyst by filtration and the unpolymerized tetrahydrofuran by vacuum distillation, 97 parts of the solid polymer of tetrahydrofuran was obtained.

*Example VIII*

One part of the filtered oily polymer of $(PNCl_2)_n$ prepared as described in Example VII and 100 parts of 2-methyltetrahydrofuran was refluxed for 4 hours. The mixture was filtered and the unpolymerized 2-methyltetrahydrofuran was removed in a vacuum leaving 40 parts of a solid polymer of 2-methyltetrahydrofuran, melting at 45° C.

What is claimed is:

Process for the polymerization of tetrahydrofuran compounds selected from the group consisting of tetrahydrofuran and alkyl tetrahydrofurans comprising heating said tetrahydrofuran compound at a temperature between about 50° C. and the atmospheric boiling point of said tetrahydrofuran in contact with a catalytic amount of an oily polymer of a phosphonitrile dihalide selected from the class consisting of chloride and bromide and of a highly dissociated salt selected from the group consisting of ammonium chloride, sodium chloride, calcium chloride, potassium chloride, potassium bromide, ammonium bromide, sodium sulfate, potassium sulfate, ammonium sulfate, sodium carbonate, potassium carbonate, sodium acetate, ammonium acetate, tetramethylenediamine dihydrochloride and tetraethyl ammonium chloride.

References Cited by the Examiner

UNITED STATES PATENTS 2,856,370    10/1958    Muetterties _____ 260—2

FOREIGN PATENTS 765,744    1/1957    Great Britain.
1,059,186    6/1959    Germany.

OTHER REFERENCES

The Van Nostrand Chemist's Dictionary, D. Van Nostrum Company, Inc., New York, 1953, page 338 relied on.

WILLIAM H. SHORT, *Primary Examiner.*

HAROLD BURSTEIN, *Examiner.*

J. T. BROWN, H. D. ANDERSON, *Assistant Examiners.*